(12) United States Patent
Gold

(10) Patent No.: US 12,437,443 B2
(45) Date of Patent: Oct. 7, 2025

(54) CURVATURE SELECTIVE CONVOLUTION FILTERS FOR VISUAL PROCESSING

(71) Applicant: Carl Steven Gold, Albany, CA (US)

(72) Inventor: Carl Steven Gold, Albany, CA (US)

(73) Assignee: Carl Gold, Albany, CA (US)

( * ) Notice: Subject to any disclaimer, the term of this patent is extended or adjusted under 35 U.S.C. 154(b) by 372 days.

(21) Appl. No.: 18/309,831

(22) Filed: May 1, 2023

(65) Prior Publication Data

US 2024/0371031 A1 Nov. 7, 2024

(51) Int. Cl.
*G06T 7/73* (2017.01)

(52) U.S. Cl.
CPC ...... *G06T 7/74* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,275,326 | B2* | 3/2016 | Piekniewski | G06N 3/02 |
| 9,412,051 | B1* | 8/2016 | Chelian | G06N 3/049 |
| 11,157,769 | B2* | 10/2021 | Wu | G06F 18/2113 |
| 11,875,527 | B1* | 1/2024 | Paz-Perez | G06T 17/00 |
| 2019/0303745 | A1* | 10/2019 | Lin | G06N 3/063 |
| 2020/0082258 | A1* | 3/2020 | Gold | G06V 10/776 |
| 2024/0403619 | A1* | 12/2024 | Shaiba Nassar | G06N 3/0495 |

OTHER PUBLICATIONS

Liu, L., She, L., Chen, M., Liu, T., Lu, H. D., Dan, Y., & Poo, M. M. (2016). Spatial structure of neuronal receptive field in awake monkey secondary visual cortex (V2). Proceedings of the National Academy of Sciences, 113(7), 1913-1918. (Year: 2016).*
Nandy, A. S., Sharpee, T. O., Reynolds, J. H., & Mitchell, J. F. (2013). The fine structure of shape tuning in area V4. Neuron, 78(6), 1102-1115. (Year: 2013).*
Carlson, E. T., Rasquinha, R. J., Zhang, K., & Connor, C. E. (2011). A sparse object coding scheme in area V4. Current Biology, 21(4), 288-293. (Year: 2011).*
Gold, C. (Sep. 2022). An Organic Convolution Model of the Ventral Visual Pathway Can Explain the Curvature Selective Shape Tuning Found in Area V4. (Year: 2022).*
Cadieu, C., Kouh, M., Pasupathy, A., Connor, C. E., Riesenhuber, M., & Poggio, T. (2007). A model of V4 shape selectivity and invariance. Journal of neurophysiology, 98(3), 1733-1750. (Year: 2007).*

* cited by examiner

*Primary Examiner* — Ian L Lemieux

(57) ABSTRACT

Systems and methods for configuring and training neural networks for visual processing tasks, specifically focusing on higher-order feature selectivity with techniques to pre-configure higher-order features into convolutional neural networks (CNNs). The method involves configuring an artificial neural network to be selective to contours comprising curved sections and straight or nearly straight sections. This includes creating a topographically organized layer of orientation-selective neurons that collectively detect multiple orientations in an image patch. Additionally, layers of neurons selective for curve segments and approximately straight contours are created, where the selection is based on inputs from previous layers. The method further extends to creating neurons selective for curves with specified curvature, orientation, and center.

20 Claims, 9 Drawing Sheets

CURVATURE SELECTIVE CONVOLUTION FILTERS FOR VISUAL PROCESSING

CROSS-REFERENCE TO RELATED APPLICATIONS

This application claims the benefit of U.S. Provisional Patent Application No. 63/337,083, filed on Apr. 30, 2022, entitled 'Curvature Selective Convolution Filters for Visual Processing' the entire disclosure of which is incorporated herein by reference.

BACKGROUND

Field

Certain aspects of the present disclosure generally relate to neural system engineering, and more particularly to systems and methods for configuring and/or training neural networks for classification and other visual processing tasks.

Background

The last several years have seen significant advances in the application of artificial neural networks to machine learning problems. Examples include the application of neural networks to visual classification tasks, auditory classification tasks, and the like, for which artificial neural networks have achieved state-of-the-art performance.

However, artificially intelligent systems continue to fail at tasks that are easy even for infants, such as learning a category from only one or a few examples.

Furthermore, in the view of many neuroscientists, this progress has not translated into increased understanding of biological intelligence. In addition, principles of biological neural networks have not informed the design of artificial neural networks in many respects.

Current state-of-the-art neural networks include techniques for configuring useful convolutional kernels corresponding to low-level feature selectivity of a biological visual system. For example, convolutional neural networks may be configured to detect oriented edges. However, higher-order features that may be detected by higher-level biological neural networks have not been preconfigured into artificial neural networks. Accordingly, techniques are disclosed herein whereby useful higher-order features of perceptual stimuli, such as curved paths having a variety of arcs and sizes, may be preconfigured into a convolutional neural network.

SUMMARY

Certain aspects of the present disclosure generally relate to providing, implementing, and using a method of configuring convolutional neural networks without training the model on data. According to certain aspects, a visual data classification network may be configured such that much of the training typically associated with neural network design may be avoided.

The method generally includes configuring an artificial neural network to be selective to contours including curved sections and straight or nearly straight sections.

The artificial neuron network comprises a first topographically organized layer of orientation-selective neurons, and wherein each orientation-selective neuron of a subset of the orientation-selective neurons is selective to an oriented line of inputs in an image patch, and wherein the subset of the orientation-selective neurons is collectively selective of a plurality of orientations in the image patch.

The method further includes creating a second topographically organized layer of neurons selective for curve segments, wherein each curve-segment-selective neuron of a subset of the curve-segment-selective neurons is selective to a curve segment, and wherein the subset of curve-segment-selective neurons is collectively selective of a plurality of curve segments in the image patch. Each curve-segment-selective neuron is configured to respond to a set of line segments in the image patch by selection of inputs from orientation-selective neurons from the first topographically organized layer, wherein excitatory weights are configured for selected inputs that are selective for line segments that form the curve segment and have positions and orientations that match the curve segment, with inputs of other orientations and locations configured to have less weight including inhibition.

The method further includes creating an approximately-straight-selective neuron, wherein the approximately-straight-selective neuron is selective to a straight or nearly straight contours having a specified orientation and degree of curvature. The approximately-straight-selective neuron having as input an output of the topographically organized layer of contour-segment-selective neurons, in which the approximately-straight-selective neuron responds to the specified orientation by selection of inputs from contour-segment-selective neurons having an orientation that matches the desired orientation, and wherein the selection is further based on a correspondence between the specified degree of curvature and a corresponding property for which individual input curve-segment-selective neurons are selective.

The method further includes creating curve-selective neurons, wherein the curve-selective neuron is selective to a curve having a specified center, a specified degree of curvature, and a specified orientation. The curve-selective neuron has as input an output of the topographically organized layer of curve-segment-selective neurons, in which the curve-selective neuron responds to the specified degree of curvature and at the specified orientation relative to the specified center by selection of inputs from curve-segment-selective neurons having an orientation that is determined systematically based on the position of the input in relation to the center, and wherein the selection is further based on a correspondence between the specified degree of curvature and a corresponding property for which individual input curve-segment-selective neurons are selective.

DETAILED DESCRIPTION

Current state-of-the-art neural networks include techniques for configuring useful convolutional kernels based on properties of biological neurons. To date, however, such techniques have only been applied that emulate low-level feature selectivity of a biological visual system. Accordingly, techniques are disclosed herein whereby higher-order features of perceptual stimuli detected by neurons (such as those found in V4) may be preconfigured into a convolutional neural network.

For processing certain images, it may be useful for feature recognizing units in a convolution neural network to respond to straight or nearly straight lines at specific orientations. For example, some units may respond to straight, or nearly straight, line segments.

For processing certain images, it may be useful for feature recognizing units in a convolution neural network to respond to different degrees of curvature. For example, some units may respond to moderately curved contours in a part of an image, and other units may respond to highly curved contours in an image.

A convolutional neural network may be configured to have units that are selective for short line segments at a variety of orientations in a small region of an image.

Furthermore, a convolutional neural network may be configured to have units that are selective for non-straight segments of a contour. For example, units that respond to corners composed of two line segments meeting at different angles, and arranged by rotation to a variety of orientations may serve such a purpose.

In addition, a convolutional neural network may be configured to have units that are selective for curved paths having a variety of arcs and sizes and rotated at a variety of orientations.

Higher order features may include the overall degree of curvature resulting from a combination of selectivity to curve segment parts in some region of an image.

Neurons selective to higher order features such as the degree of curvature may be helpful in creating neural networks that learn from one or a few examples.

Selectivity for Small Line Segments

It has been known for many years that convolution filters may make units selective for short line segments at different orientations and that this is a good description for neural activity in the visual area V1. (Hubel and Wiesel, Receptive fields, binocular interaction and functional architecture of the cat's visual cortex, 1962)

Creating convolution filters responsive to small line segments may be accomplished by a variety of means without the use of training data. One well-known approach is to use Gábor filters.

Figure 1:
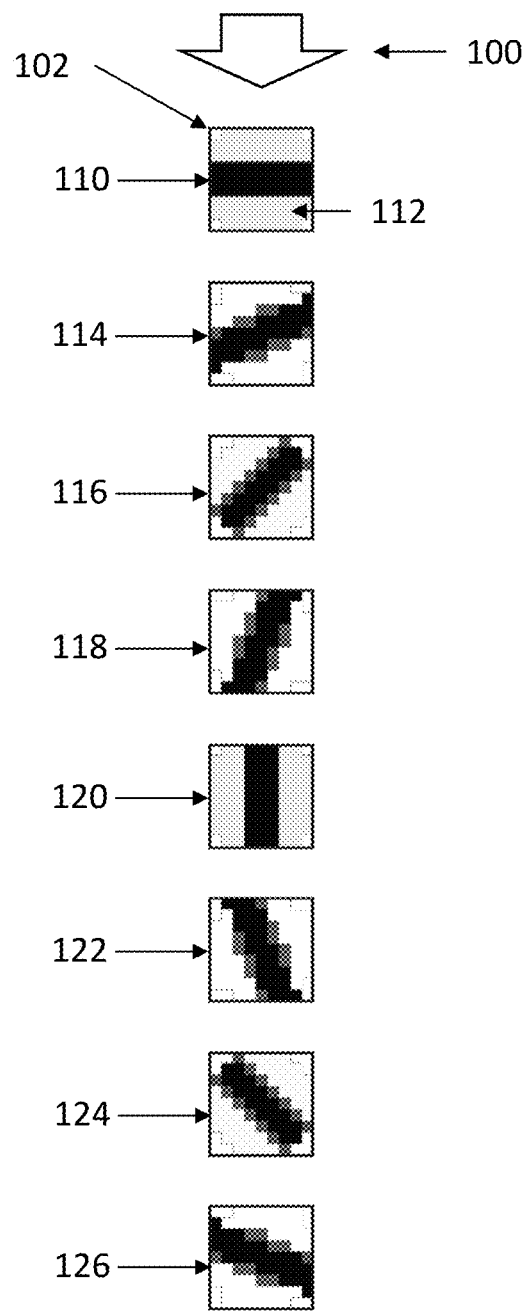
FIG. 1 illustrates convolution filters that have selectivity for short line segments at a variety of orientations.

FIG. 1 illustrates the basic principle simply. The input 100 to the convolution filter at this stage is the intensity of the image at each position. This constitutes a single channel of inputs—for each position in the input image, a single real value summarizes the information about that location and is fed into the layer.

A convolution filter 102 may cover a small region of an image, also known as a patch, or image patch.

An excitatory weighted strip 110 may be centered in the filter and surrounded by inhibition 112. The excitatory strip 110 may be oriented horizontally and as a result units based on this the filter may respond to horizontally oriented lines segments in the patches of an image to which it is applied.

The same approach may be used to create units with selectivity for short, oriented lines at a variety of orientations. For example, units may respond to lines oriented at 22.5° (114), 45° (116), 67.5° (118), 90° (120), 112.5° (122), 135° (124) and 157.5° (126).

Selectivity for Long Line Segments and Corners

Recent neurophysiological observations suggest that visual area V2 contains a significant number of units with selectivity composed of subunits. The individual V2 subunits have selectivity for short line segments, and those subunits may be either aligned or at an angle to each other (Liu et al., Spatial structure of the neuronal receptive field in awake monkey secondary visual cortex (v2), 2016). V2 units with aligned subunits may have receptivity to a single long line, and V2 units with subunits at angle may have receptivity to lines intersecting in corners. There may be V2 units having selectivity for a variety of orientations with respect to the visual input.

For convolutional neural networks, there may be multiple benefits to composing selectivity to corners (or other embodiments of curve segment selectivity) from an input layer composed of line segments rather than directly creating selectivity to corners from the raw input.

One benefit to composing selectivity to corners or other embodiments of curve segment selectivity from an input layer composed of line segments may be that it improves the efficiency of the network, as a single line segment in the input layer may be used for multiple corner selective units which would otherwise have to repeat the selectivity for that image patch.

Another benefit to composing selectivity to corners or other embodiments of curve segment selectivity from an input layer composed of line segments may be that it improves the invariance or robustness of the selectivity in response to degraded images.

Robustness and invariance of the selectivity may increase when, in accordance with certain aspects of the present disclosure, a neural network is configured so that there is a pooling layer of neurons after the layer selective for short line segments and before the layer selective for corners and long lines.

Figure 2:
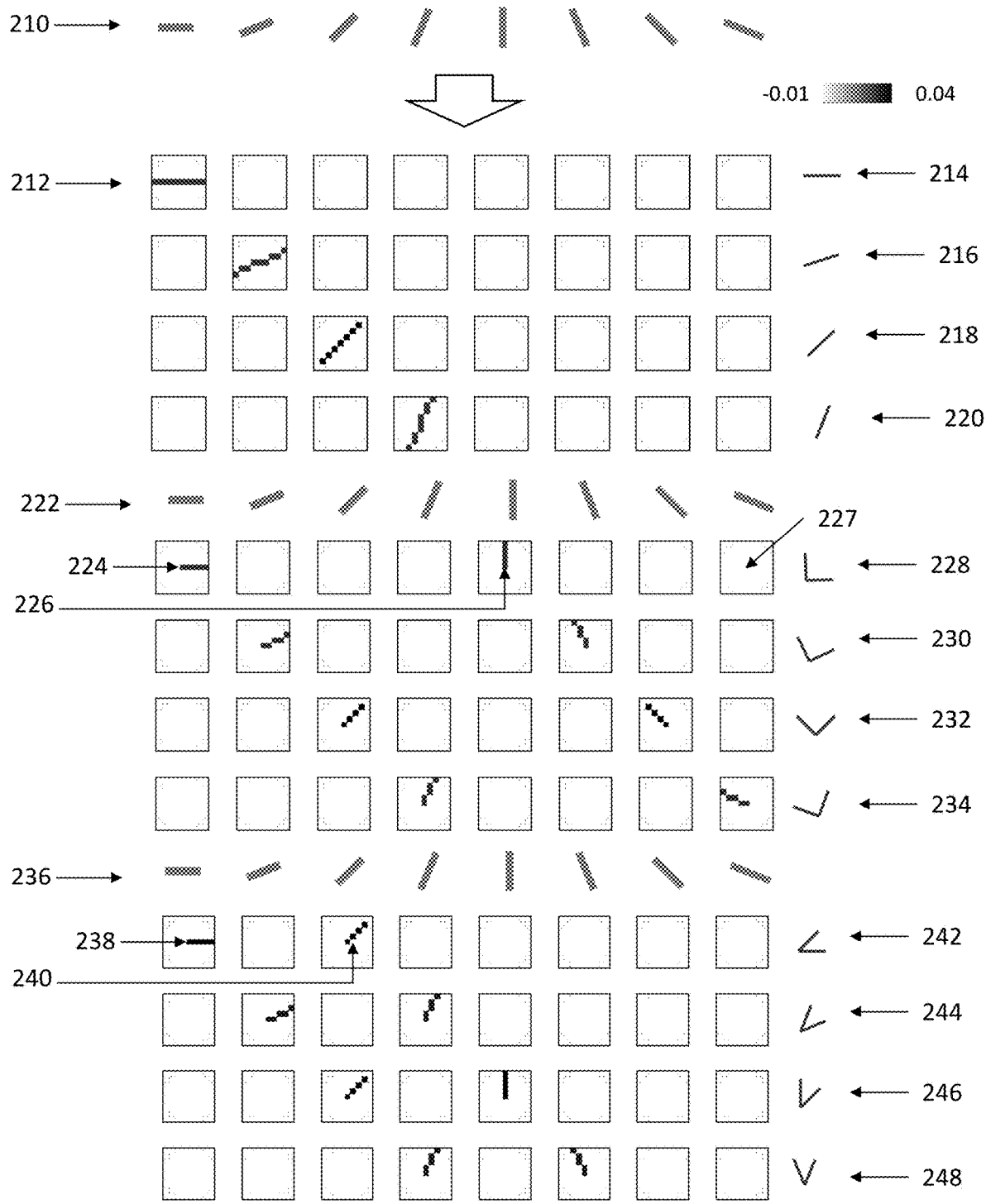
FIG. 2 illustrates convolution filters that have selectivity for extended straight line segments and corners with a variety of angles separating the arms and at a variety of orientations.

FIG. 2 illustrates how selectivity for corners with a variety of internal angles, including fully straight lines, may be implemented in a convolutional neural network without the use of training data. This may be implemented in a neural network layer after a layer with selectivity for short line segments. The output of each orientation of line selective units at a variety of locations tiling the visual space may be considered as separate channels of inputs in the later layer. Continuing the example of FIG. 1, there may be 8 channels of inputs 210 each corresponding to one orientation of line segment selective unit from FIG. 1. Correspondingly, each convolution filter in the line and corner selective layer, like filter 212, may have weights for 8 channels of inputs.

Row 212 shows how the weights for a convolution filter may be configured to create units with that may be selective for long lines, 214. This may be achieved by arranging excitatory inputs with selectivity to short horizontal lines in a horizontal band in the center of the filter. Other inputs (from the 7 other channels) may be inhibited.

The same approach may be used to create filters with selectivity for long lines at other orientations: 216-220 shows the filters that may give selectivity to long lines oriented at 22.5° (216), 45° (218), 67.5° (220). A layer selective for long lines and corners, in accordance with certain aspects of the present disclosure, may contain filters selective for long lines at other orientations that are not illustrated in FIG. 2. Detailed descriptions of such units are omitted for brevity.

For ease of understanding, the input channels are repeated in row 222 for filters selective to right-angle corners at different orientations, as illustrated on the right side of each of rows 228, 230, 232, and 234. According to certain teachings of the present disclosure, the input channels may be reused by multiple units in a receiving layer.

To create a filter selective for a right-angle corner with the arms at 0° and 90°, the input channel from short segments of horizontally aligned inputs may be configured to have excitatory weight on inputs in a strip from the center to the right edge of the receptive filed 224, and the input channel from short segments of vertically aligned inputs may be configured to have excitatory weight on inputs in a strip from the center to the top of the filter 226. Other 227 inputs may be inhibitory.

The same approach may be used to create filters selective for right angle corners at other orientations. For example, the filters illustrated in row 230 may create selectivity for a right-angle corner with arms at 22.5° and 112.5°; the filters illustrated in row 232 may create selectivity for a right-angle corner with arms at 45° and 135°; and the filters illustrated in row 234 may create selectivity for a right-angle corner with arms at 67.5° and 157.5°. The layer selective for long lines and corners may contain filters selective for right-angled corners at other orientations, which are omitted for brevity.

For ease of understanding, the input channels are repeated in row 236 for filters selective to 45°-angle corners at different orientations, 242-248.

To create a filter selective for a 45° angle corner with the arms at 0° and 45°, the input channel from short segment of horizontally aligned inputs may be configured to have excitatory weight on inputs in a strip from the center to the right edge of the receptive field 238, and the input channel from short segments of 45° oriented inputs may be configured to have excitatory weight on inputs in a strip from the center to the upper right edge of the filter 240. Other inputs may be inhibitory.

The same approach may be used to create filters selective for 45° angle corners at other orientations. For example, the filters illustrated in row 244 may create selectivity for a 45°-angle corner with arms at 22.5° and 67.5°; the filters illustrated in row 246 may create selectivity for a 45°-angle corner with arms at 45° and 90°; and the filters illustrated in row 248 may create selectivity for a 45°-angle corner with arms at 67.5° and 112.5°. The layer selective for long lines and corners may contain filters selective for 45°-angled corners at other orientations, which are omitted for brevity.

The same approach may be used to create filters selective for corners having other interior angles which are omitted for brevity. References in the sections that follow to unit selectivities of FIG. 2 may be understood to include filters selective for corners with interior angles ranging from 45° to 157.5°, which may also be configured in a similar manner.

Straight and Slightly Curved Line Selectivity

Recent neurophysiological observations (Nandy et al., The Fine Structure of Shape Tuning in Area V4, 2013) suggest that visual area V4 may contain neurons that are sensitive to straight, or nearly straight, line segments, at narrow range of orientations, in patches of an image, such as a curvature less than 45° over a given image patch.

Figure 3:
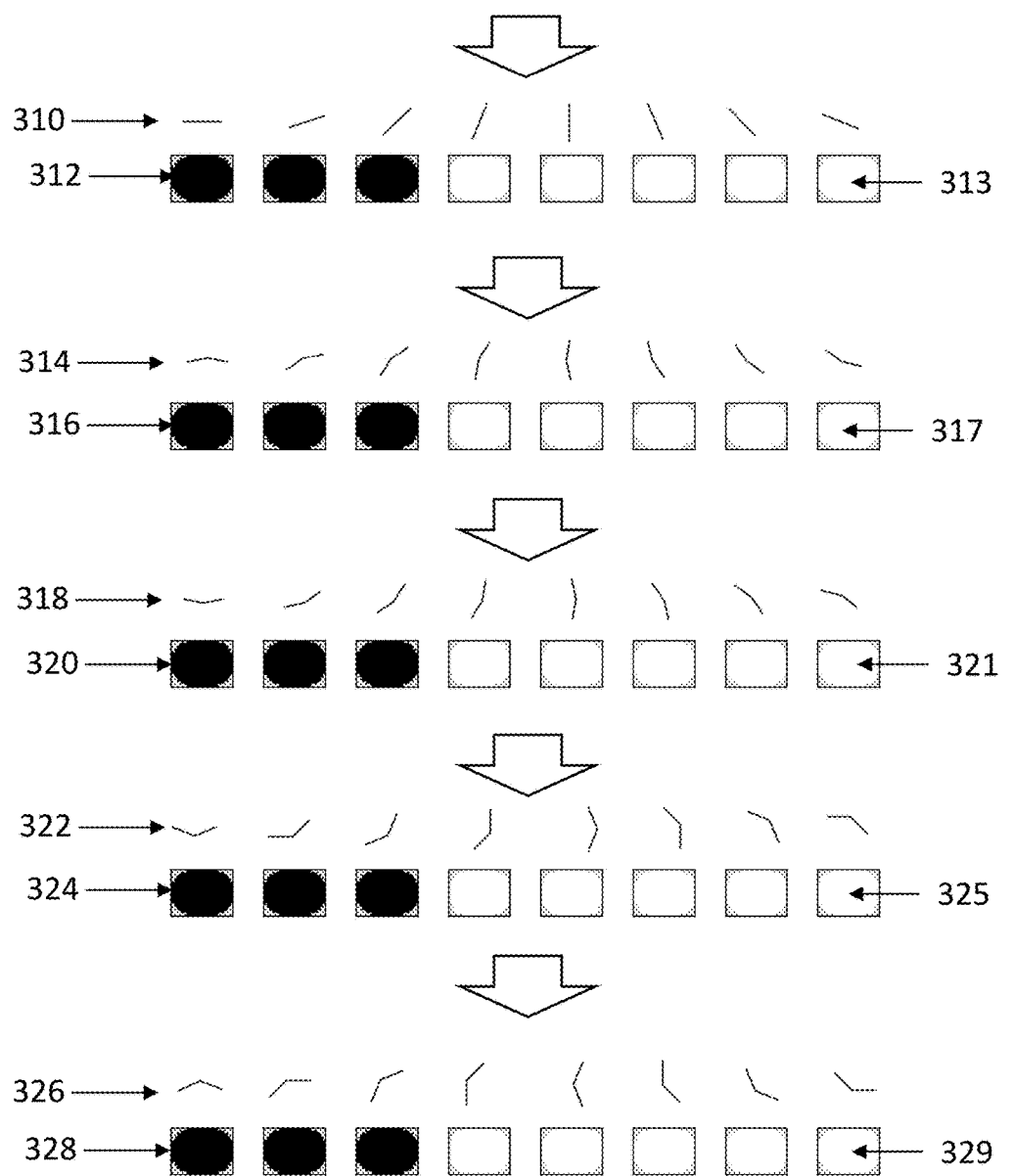
FIG. 3 illustrates convolution filters that are configured to have selectivity for straight or nearly straight lines at a particular orientation in regions of an image, in accordance with certain aspects of the present disclosure.

FIG. 3 illustrates an embodiment of certain aspects of the present disclosure in which convolution weights are configured to respond selectively to straight lines and also slightly curved lines within a specific range of orientations centered at an angle of 22.5° counter clockwise from horizontal.

FIG. 3 illustrates the selectivities of input channels from a previous layer in a convolutional neural network, such as a neural network having layers with selectivities corresponding to the illustrations in FIGS. 1 and 2. In an embodiment, there may be 40 channels of inputs, the selectivities of which are illustrated in rows 310, 314, 318, 322 and 326, each corresponding to one orientation of one line or corner selective unit like those illustrated in FIG. 2. Correspondingly, each convolution filter in the slightly curved and straight line selective layer may have weights for 40 channels of inputs. These channels may include units sensitive to straight lines at a variety of orientations 310 and nearly straight lines (corners with a 157.5° angle) at a variety of orientations 314 and 318 and slightly bent lines (corners with a 135° angle) 322 and 326. FIG. 3 shows pictograms of the preferred stimuli like 214, 216, 218 and 220 and includes other channels from the preceding layer that were omitted for brevity.

The input channels indicated in rows 310, 214, 318, 322, and 326 may be considered grouped by orientation columnwise. This row-by-column arrangement may facilitate configuration of unit selectivity in this layer. The neural network layer may be configured to have excitative or inhibitory connections to channels near the same orientation.

FIG. 3 shows how a unit may be configured so that there are excitatory connections, such as 312, from straight or nearly straight lines that may have a range of 45° of orientations centered at an angle 22.5° counter-clockwise from horizontal, and at a range of locations in the receptive field.

There may be inhibitory connections 313 from straight or nearly straight lines at other non-preferred orientations at locations throughout the receptive field.

In FIG. 3, the selectivity of the input channels as illustrated are tuned for slightly bent corners in addition to straight lines. In other embodiments the input channels may be selective for slightly curved segments or arcs.

There may be excitatory connections 316 and 320 from nearly straight line 314 and 318 that may have a range of 45° of orientations centered at an angle 22.5° counter-clockwise from horizontal at a range of locations in the receptive field.

There may be inhibitory connections 317 and 321 from nearly straight lines at other non-preferred orientations at locations throughout the receptive field.

There may be excitatory connections 324 and 328 from slightly bent lines 322 and 326 that may have a range of 45° of orientations centered at an angle 22.5° clockwise from horizontal at a range of locations in the receptive field.

There may be inhibitory connections 325 and 329 from slightly bent lines at other non-preferred orientations at locations throughout the receptive field.

In FIG. 3 the receptive fields are defined to correspond to that of a biological neuron by having an elliptical shaped region of excitatory and inhibitory connections and zero outside the elliptical receptive field. In other embodiments the receptive field may be defined to be rectangular or other shapes.

Figure 4:
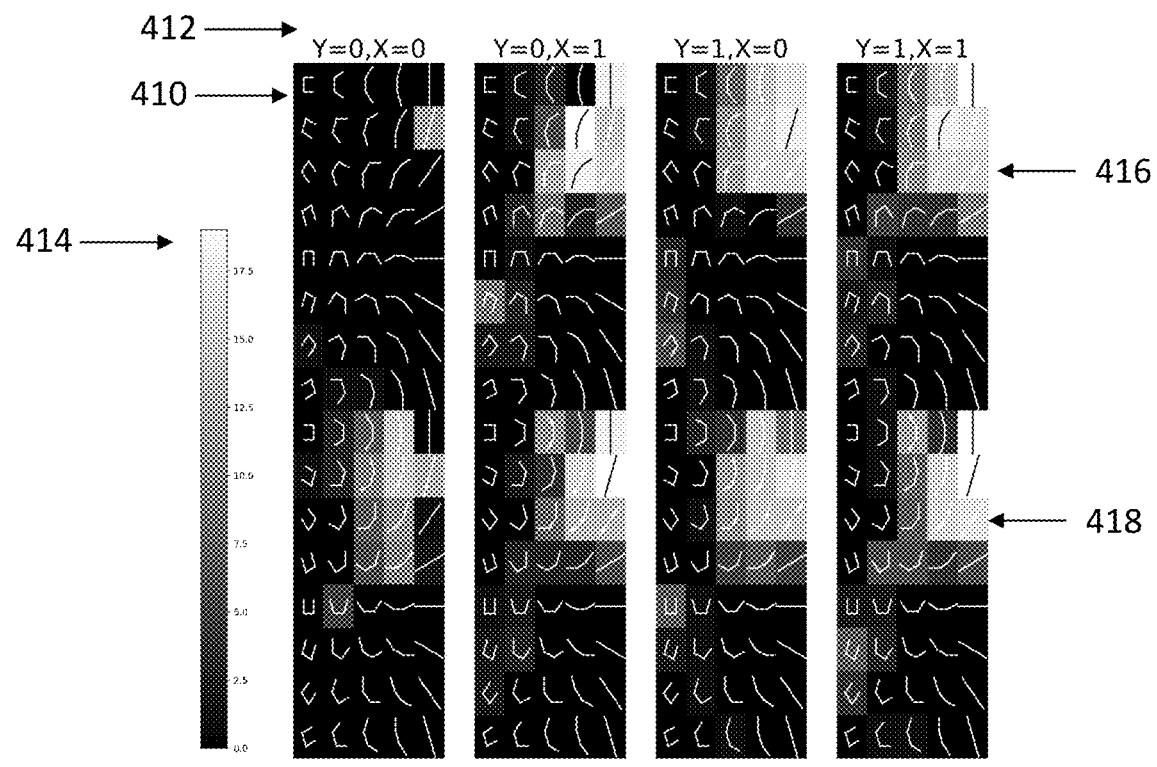
FIG. 4 illustrates the response of convolution filters that are configured to be selective for straight or nearly straight lines on a benchmark set of images of straight, moderately curved and highly curved lines at a variety of orientations.
Figure 4:
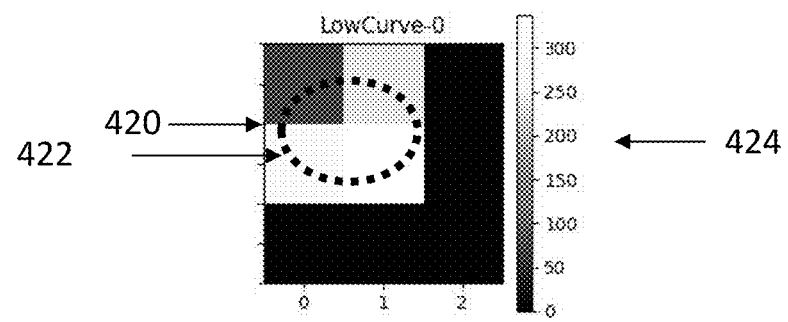

FIG. 4 illustrates a possible response of this example neural unit, configured as described in reference to FIG. 3. The responses are shown to a range of straight lines and curves of varying degree of curvature at a variety of orientations. The response to such lines and curves is shown at 4 positions 412 and 420 partially covered by the range of the unit receptive field 422.

The response to a variety of different oriented curves 410 is shown for each position. The response may be highest 414 and 424 to straight and nearly straight lines at orientations within the range of orientations centered around an angle slightly counter-clockwise to horizontal 416 and 418. At other curvatures and orientations the response may be lower or none.

Medium Curvature Selectivity

Recent neurophysiological observations (Nandy et al.) suggest that visual area V4 may contain neurons that are sensitive to different degrees of curvature in patches of an image. For example, some neurons respond to image patches containing a medium degree of curvature, such as a curvature between 45° and 135° degrees over a given area of the receptive field.

Figure 5:
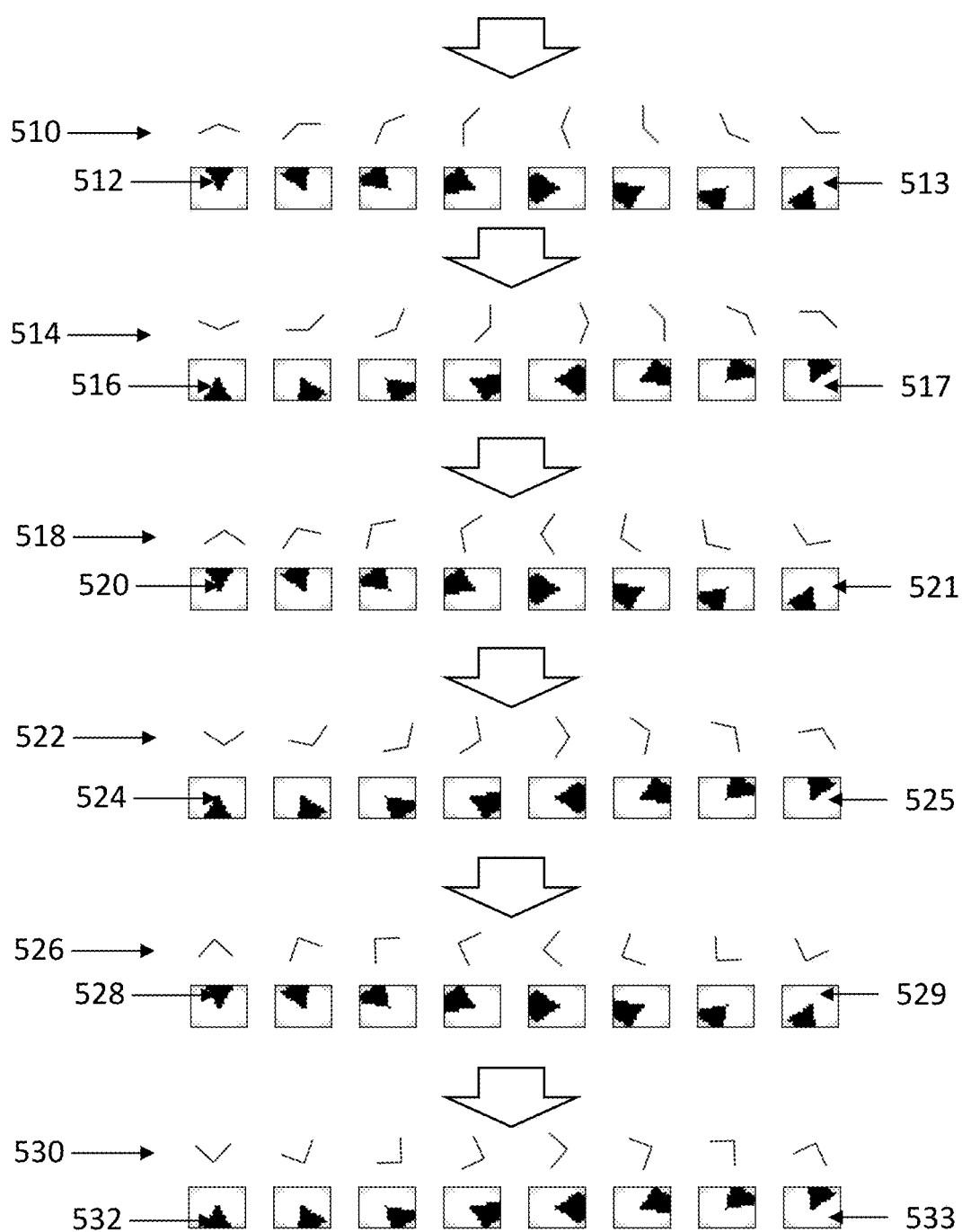
FIG. 5 illustrates a pattern of connections that may be configured to generate selectivity for medium degrees of curvature in regions of an image, in accordance with certain aspects of the present disclosure.

FIG. 5 illustrates an embodiment of certain aspects of the present disclosure in which convolution weights are configured to respond selectively to curvatures with a medium degree of curvature. The inputs to the convolution filters are the outputs of channels in the previous layer of the network, as above. Continuing the example of FIGS. 1 and 2, there may be 48 channels of inputs 510, 514, 518, 522, 526 and 530 each corresponding to one corner selective unit like those illustrated in FIG. 2. FIG. 5 shows pictograms of the preferred stimuli like 228, 230 232 and 234 and includes other channels from the preceding layer that were omitted from FIG. 2 for brevity.

FIG. 5 illustrates the input channels 510, 514, 518, 522, 526 and 530 from a previous layer in a convolutional neural network, drawn at a particular location corresponding to a row and column index. These channels may include units sensitive to lines forming 135° corners at a variety of orientations 510 and 514, and lines forming 112.5° corners at a variety of orientations 518 an d 522, and lines forming 90° corners at a variety of orientations 526 and 530.

The input channels 510, 514, 518, 522, 526 and 530 may be considered organized by orientation column-wise. This row-by-column arrangement may facilitate configuration of unit selectivity in this layer. The neural network may be configured to have excitative or inhibitory connections to channels near the same orientation, and at the same time selective for a range of corner angles.

FIG. 5 shows that configuring curvature selectivity may include configuring excitatory connections 512, 516, 520, 524, 528 and 532 from corner selective units, so that the orientation of the input units to which excitatory connections are configured systematically changes throughout the receptive field depending on the angle in relation to the center of the receptive field. For example, the locations of the excitatory zones 512, 520 and 528 are above the center, and they form excitatory connections to inputs selective for corners that open downward. Similarly, excitatory connections 516, 524 and 532 are located below the center of the receptive field, and they form excitatory connectors to inputs selective for corners that open upward.

FIG. 5 also shows that there may be inhibitory connections 513, 517, 521, 525 529 and 533 from corner selective features in locations where they are not oriented convex to the center of the receptive field.

In FIG. 5, the selectivity of the input channels is illustrated as tuned for angles or corners. In other embodiments the input channels may be selective for curved segments with different arcs and shapes.

In FIG. 5, the selectivity of the input channels is illustrated as excitatory for curvatures that are convex in orientation to the center of the receptive field. In other embodiments the input channels selected may be concave with respect to the center of the receptive field.

Figure 6:
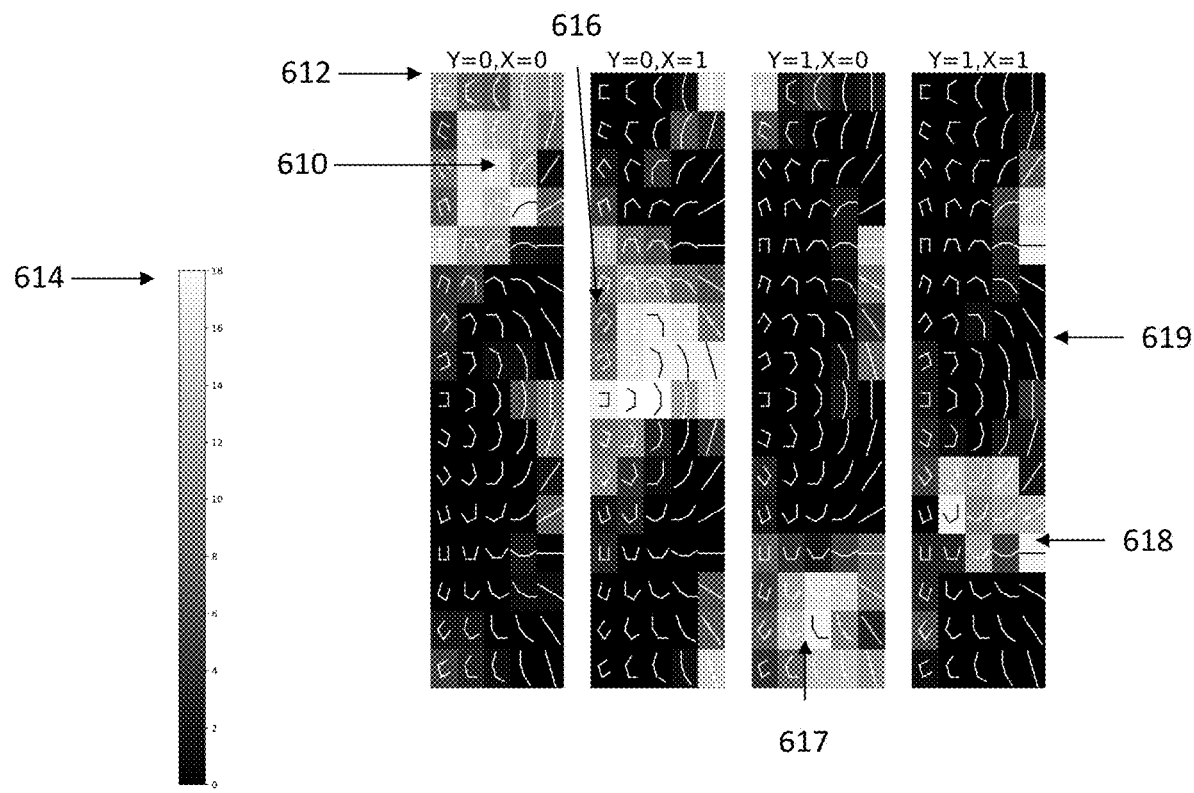
FIG. 6 illustrates the response of convolution filters that are configured to be selective for medium degrees of curvature on a benchmark set of images of straight, moderately curved and highly curved lines at a variety of orientations.

FIG. 6 illustrates a possible response of the unit configured as illustrated and described in reference to FIG. 5 to a range of straight lines and curves of varying degree of curvature at a variety of orientations. The response to such lines and curves is shown at 4 positions 612 and 620 covered by the range of one unit's receptive field 622.

The response to a variety of different oriented curves is shown for each position. The response may be highest 614 to moderately curved shapes 610, 616, 617 and 618 that are convex towards the center of the receptive field. At other curvatures and orientations for example 619, the response may be lower or none.

High Curvature Selectivity

Recent neurophysiological observations (Nandy et al.) suggest that visual area V4 may contain neurons that are sensitive to different degrees of curvature in patches of an image. For example, some neurons respond to image patches containing a high degree of curvature such as curves with a degree greater than 135° over a given area of the receptive field.

Figure 7:
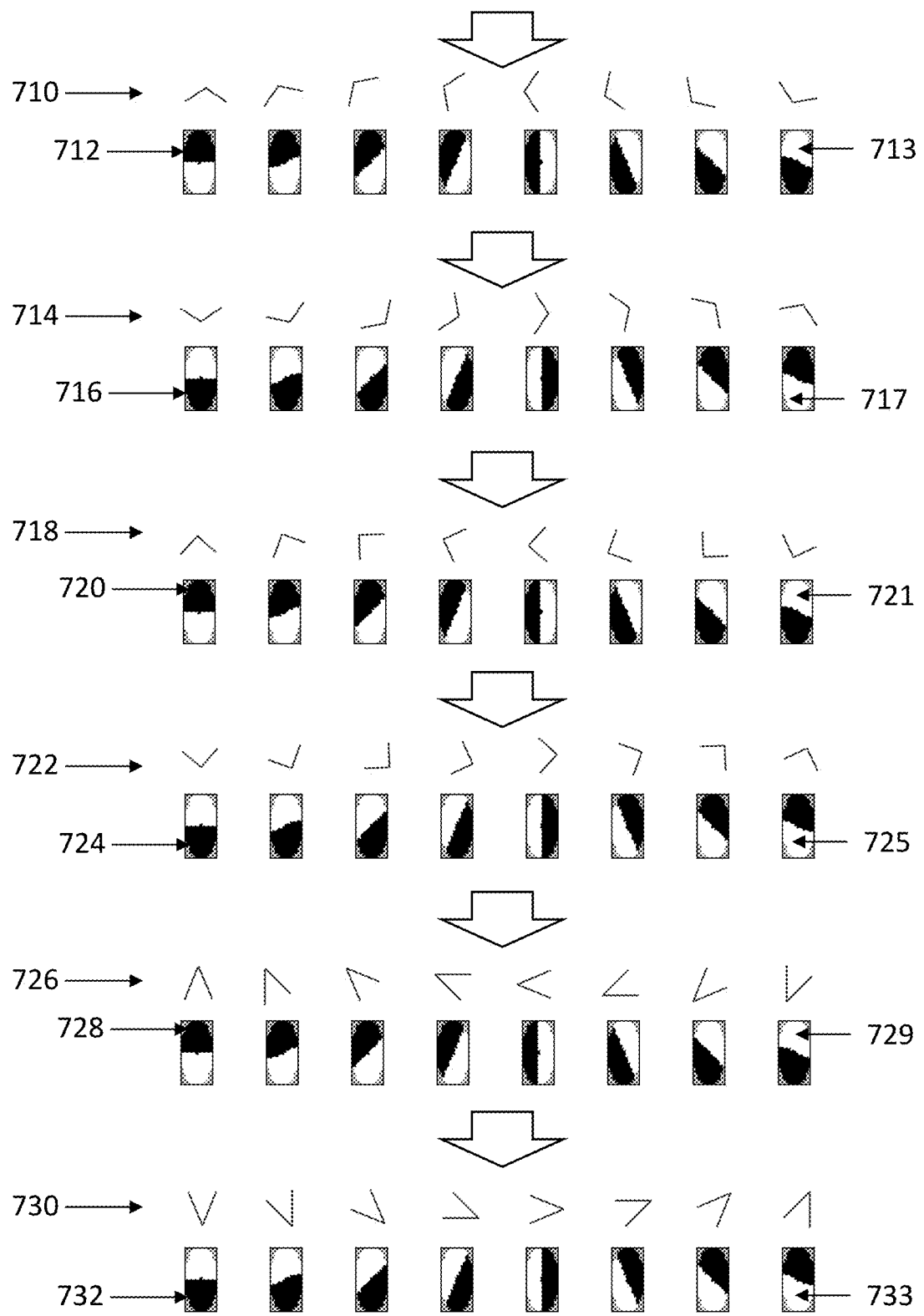
FIG. 7 illustrates a pattern of connections that may be configured to generate selectivity for a high degree of curvature in regions of an image, in accordance with certain aspects of the present disclosure.

FIG. 7 illustrates an embodiment of certain aspects of the present disclosure, in which convolution weights may be configured to respond selectively to curvatures with a high degree of curvature, such as a curvature greater than 135° degrees over a small area of the receptive field. The inputs to the convolution filters are the outputs of channels in the previous layer of the network. For example, when a applied to a neural network that has layers with properties corresponding to the layers illustrated in FIGS. 1 and 2, there may be 48 channels of inputs, such as are illustrated in rows 710, 714, 718, 722, 726 and 730 where each illustrated input corresponds to one orientation of one corner selective unit from the layer corresponding to FIG. 2. FIG. 7 shows pictograms of the preferred stimuli like 242, 244 246 and 248 and includes other channels from the preceding layer that were omitted from FIG. 2 for brevity.

FIG. 7 illustrates the input channels 710, 714, 718, 722, 726 and 730 from a previous layer in a convolutional neural network, drawn at a particular location corresponding to a row and column index. These channels may include units sensitive to lines forming 112.5° corners at a variety of orientations 710 and 714, and lines forming 90° corners at a variety of orientations 718 and 722, and lines forming 67.5° corners at a variety of orientations 726 and 730.

The input channels illustrated in rows 710, 714, 718, 722, 726 and 730 may be considered organized column-wise by orientation. This row-by-column arrangement may facilitate configuration of unit selectivity in this layer. The neural network layer may be configured to have excitative or inhibitory connections to channels near the same orientation, and at the same time selective for a range of corner angles.

FIG. 7 shows that there may be excitatory connections 712, 716, 720, 724, 728 and 732 from corner selective units having an orientation that changes throughout the receptive field depending on the angle in relation to the center of the receptive field. For example, the locations of the excitatory zones 712, 720 and 728 are above the center, and they may form excitatory connections to inputs selective for corners that open downward. Similarly, excitatory connections 716, 724 and 732 are located below the center of the receptive field, and they may form excitatory connectors to inputs selective for corners that open upward.

FIG. 7 also shows that there may be inhibitory connections 713, 717, 721, 725 729 and 733 from corner selective features in locations where they are not oriented convex to the center of the receptive field.

In FIG. 7, the selectivity of the input channels is illustrated as tuned for angles or corners. In other embodiments the input channels may be selective for curved segments with different arcs and shapes.

In FIG. 7, the selectivity of the input channels is illustrated as excitatory for curvatures that are convex in orientation to the center of the receptive field. In other embodiments the input channels may be concave with respect to the center of the receptive field.

Figure 8:
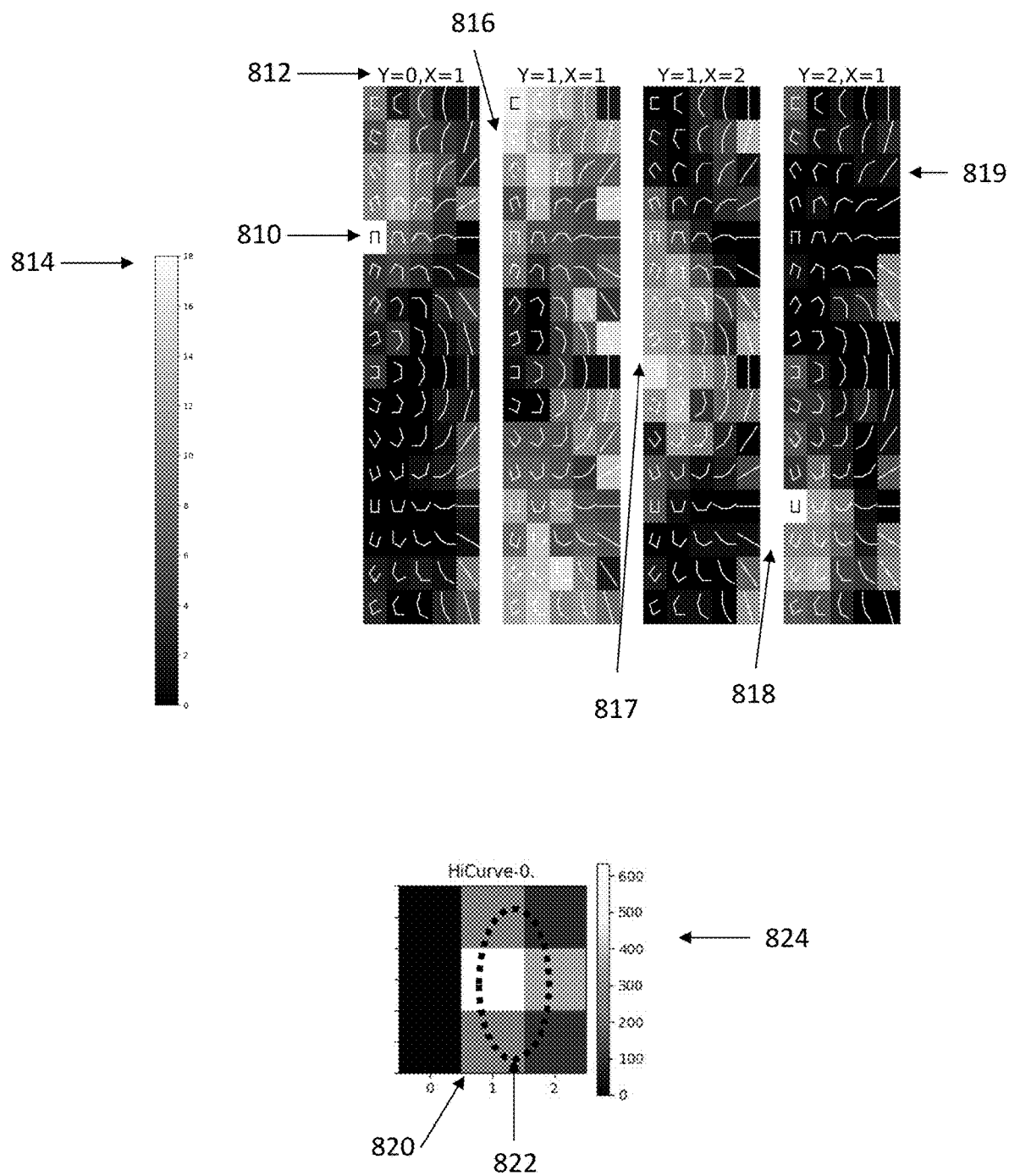
FIG. 8 illustrates the response of convolution filters that are configured to be selective for a high degree of curvature on a benchmark set of images of straight, moderately curved and highly curved lines at a variety of orientations.

FIG. 8 illustrates a possible response of this configured unit to a range of straight lines and curves of varying degree of curvature at a variety of orientations. The response to such lines and curves is shown at 4 positions 812 and 820 covered by the range of a unit receptive field 822.

The response to a variety of different oriented curves is shown for each position. The response may be highest 814 and 824 to highly curved shapes 810, 816, 817 and 818 that are convex towards the center of the receptive field. At other curvatures and orientations for example 819, the response may be lower or none.

Selectivity for Arcs

An alternative embodiment of the methods described herein may use arcs selective neurons as curve-segment selective neurons in addition to or in place of corner selective neurons.

Figure 9:
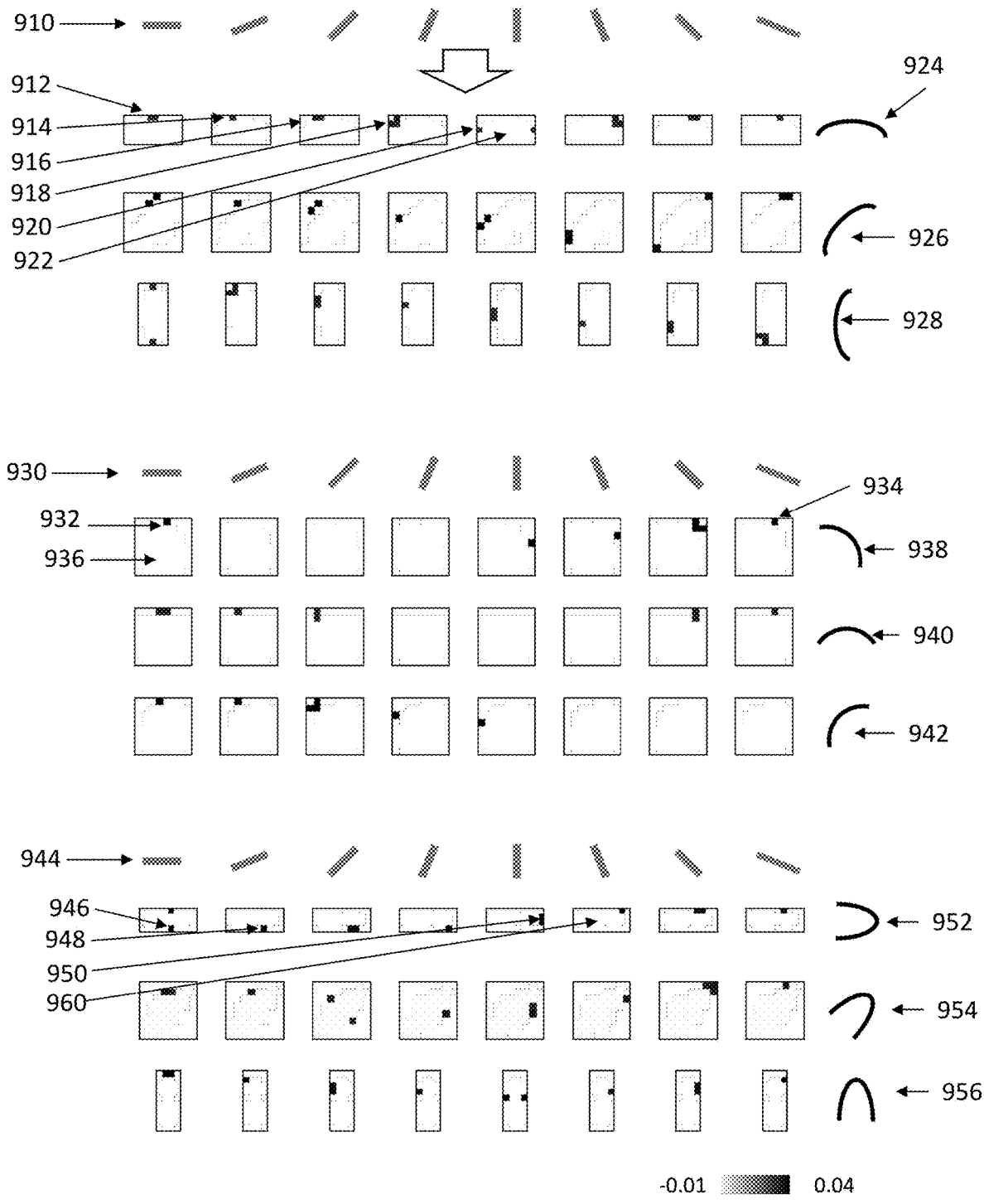
FIG. 9 illustrates convolution filters that are configured to have selectivity for arcs with different degrees of curvature, in accordance with certain aspects of the present disclosure.

FIG. 9 illustrates how selectivity for small arcs in image patches may be implemented in a convolutional neural network without the use of training data. This may be implemented in a neural network layer after the layer with selectivity for short line segments. The output of each orientation of line selective units at a variety of locations tiling the visual space may be considered as separate channels of inputs in the later layer. Continuing the example of FIG. 1, there may be 8 channels of inputs 910 each corresponding to one orientation of line segment selective unit from FIG. 1. Correspondingly, each convolution filter in the line and corner selective layer, like filter 924, may have weights for 8 channels of inputs.

Row 912 shows the weights for a convolution filter that may be selective for gently curved arcs, 924. This may be embodied by defining an ellipse in which the major axis may be twice the length of the minor axis and selecting line segments that lie on and are tangent to the path of half of the ellipse between the two major axes, including the co-vertex. For example, at the co-vertex 912 an input segment that is horizontal is selected, and as the arc follows the path of the ellipse to the vertex 914, 916, 918 an 920 the orientation of the selected input changes from horizontal to vertical. Other inputs for example 922 to the filter may be defined to have less weight including inhibition.

The same approach may be used to embody filters with selectivity for gently curved arcs at other orientations by rotating the orientation of the ellipse defining the path: 926 and 928 shows the filters that may give selectivity to gently curved arcs oriented at 45° (926) and 90° (928). The layer selective for arcs may contain filters selective for gently curved arcs at other orientations, which are omitted for brevity.

The input channels are repeated 930 for filters selective to medium curvature arcs at different orientations, 938, 940 and 942.

Row 938 shows the weights for a convolution filter that may be selective to arcs with medium curvature, 938. This may be achieved by defining an ellipse in which the major axis is equal to the length of the minor axis, or equivalently a circle, and selecting line segments that lie on and are tangent to the path of half of the circle for a 90° arc. For example, at the top of the circle 932 an input segment that is horizontal is selected, and as the arc follows the path of the ellipse to the 934 the orientation of the selected input changes to remain tangent to the circle. Other inputs to the filter for example 936 may be defined to have less weight including inhibition.

The same approach may be used to embody filters selective for medium curvature arcs at other orientations. For example, the filters 938 may create selectivity for a medium curvature arc spanning from 12:00 to 3:00, and the filters 940 may create selectivity for a medium curvature arc spanning from 10:30 to 1:30, and the filters 942 may create selectivity for a medium curvature arc spanning from 9:00 to 12:00. The layer selective for arcs may contain filters selective for medium curvature arcs at other orientations, which are omitted for brevity.

The input channels are repeated 944 for filters selective to high curvature arcs 952, 954 and 956.

Row 952 shows the weights embodying a convolution filter that may be selective for highly curved arcs having convex side open to the left, 952. This may be achieved by defining an ellipse in which the major axis may be twice the length of the minor axis and selecting line segments that lie on and are tangent to the path of half of the ellipse between the two minor axes, including the vertex. For example, at the co-vertex 946 an input segment that is horizontal is selected, and as the arc follows the path of the ellipse to the vertex 948 the orientation of the selected input may change from horizontal 946 to vertical 950. Other inputs for example 960 to the filter may be defined to have less weight including inhibition.

The same approach may be used to embody filters selective for high curvature arcs at other orientations. For example, the filters 954 may create selectivity for a high curvature arc with convex opening rotated to 45 degrees below horizontal and the filters 956 may embody selectivity for a high curvature arc with the convex opening oriented downward. The layer selective for arcs may contain filters selective for high curvature arcs at other orientations, which are omitted for brevity.

What is claimed is:

1. A method of configuring an artificial neural network to be selective to curvature, wherein the artificial neuron network comprises a first topographically organized layer of orientation-selective neurons, and wherein each orientation-selective neuron of a subset of the orientation-selective neurons is selective to an oriented line of inputs in an image patch, and wherein the subset of the orientation-selective neurons is collectively selective of a plurality of orientations in the image patch, the method comprising:

creating a second topographically organized layer of neurons selective for curve segments, wherein each curve-segment-selective neuron of a subset of the curve-segment-selective neurons is selective to a curve segment, and wherein the subset of curve-segment-selective neurons is collectively selective of a plurality of curve segments in the image patch; in which each curve-segment-selective neuron is configured to respond to a set of line segments in the image patch by selection of inputs from orientation-selective neurons from the first topographically organized layer, wherein excitatory weights are configured for selected inputs that are selective for line segments that form the curve segment and have positions and orientations that match the curve segment, with inputs of other orientations and locations configured to have less weight including inhibition; and creating a curve-selective neuron, wherein the curve-selective neuron is selective to a curve having a specified center, a specified degree of curvature, and a specified orientation, the curve-selective neuron having as input an output of the topographically organized layer of curve-segment-selective neurons, in which the curve-selective neuron responds to the specified degree of curvature and at the specified orientation relative to the specified center by selection of inputs from curve-segment-selective neurons having an orientation that is determined systematically based on the position of the input in relation to the center, and wherein the selection is further based on a correspondence between the specified degree of curvature and a corresponding property for which individual input curve-segment-selective neurons are selective.

2. The method of claim 1, wherein the corresponding property is a corner selectivity, and in which the curve segment selective layer is a corner selective layer wherein each corner-selective neuron of a subset of the corner-selective neurons is selective to a pair of line segments that intersect at a vertex in the image patch, and wherein the subset of corner-selective neurons is collectively selective of a plurality of angle and orientation pairs in the image patch; in which each corner-selective neuron is configured to respond to a specified angle and orientation pair in the image patch by selection of inputs from orientation-selective neurons from the first topographically organized layer, wherein excitatory weights are configured for selected inputs that are selective for line segments that intersect at a vertex and have an orientation and angle that match the specified angle and orientation pair, with inputs of other orientations and locations configured to have less weight including inhibition.

3. The method of claim 1, wherein the corresponding property is an arc selectivity, and in which the curve segment selective layer is an arc selective layer wherein each arc-selective neuron of a subset of arc-selective neurons is selective to a set of line segments that lie on a path of the arc and have orientation tangent to a specified arc, and wherein the subset of arc-selective neurons is collectively selective of a plurality of arcs in the image patch; in which each arc-selective neuron is configured to respond to a specified interior angle and orientation pair in the image patch by selection of inputs from orientation-selective neurons from the first topographically organized layer, wherein excitatory weights are configured for inputs that are selective for line segments that lie on the path of the arc and have orientation tangent to the specified arc, with inputs of other orientations and locations configured to have less weight including inhibition.

4. The method of claim 3, wherein each arc is specified by defining an ellipse, including the size of the major and minor axes of the ellipse, and the arc is specified to follow a defined portion of the path of the ellipse.

5. The method of claim 1 in which there are pooling layers in between one or more of the layers selective for orientations, curve segments, and curvatures created by an aggregation function over the inputs from the preceding layer.

6. The method of claim 1 in which the orientation of the curve segment selective units in the curve selective layer is systematically oriented to be convex towards the center of the receptive field.

7. The method of claim 1 in which the orientation of the curve segment selective units in the curve selective layer is systematically oriented to be concave towards the center of the receptive field.

8. A method of configuring an artificial neural network to be selective to straight contours including approximately straight contours, wherein the artificial neuron network comprises a first topographically organized layer of orientation-selective neurons, and wherein each orientation-selective neuron of a subset of the orientation-selective neurons is selective to an oriented line of inputs in an image patch, and wherein the subset of the orientation-selective neurons is collectively selective of a plurality of orientations in the image patch, the method comprising:

creating a second topographically organized layer of neurons selective for contour segments including both fully straight and curved segments, wherein each contour-segment-selective neuron of a subset of the contour-segment-selective neurons is selective to a contour segment, and wherein the subset of contour-segment-selective neurons is collectively selective of a plurality of contour segments in the image patch; in which each contour-segment-selective neuron is configured to respond to a set of line segments in the image patch by selection of inputs from orientation-selective neurons from the first topographically organized layer, wherein excitatory weights are configured for selected inputs that are selective for line segments that form the contour segment and have positions and orientations that match the contour segment, with inputs of other orientations and locations configured to have less weight including inhibition; and creating an approximately-straight-selective neuron, wherein the approximately-straight-selective neuron is selective to a straight or nearly straight contours having a specified orientation and degree of curvature, the approximately-straight-selective neuron having as input an output of the topographically organized layer of contour-segment-selective neurons, in which the approximately-straight-selective neuron responds at the specified orientation by selection of inputs from contour-segment-selective neurons having an orientation that matches the desired orientation, and wherein the selection is further based on a correspondence between the specified degree of curvature and a corresponding property for which individual input curve-segment-selective neurons are selective.

9. The method of claim 8, wherein the corresponding property is a corner selectivity, and in which the contour segment selective layer is a corner selective layer wherein each corner-selective neuron of a subset of the corner-selective neurons is selective to a pair of line segments that intersect at a vertex in the image patch, and wherein the subset of corner-selective neurons is collectively selective of a plurality of angle and orientation pairs in the image patch;

in which each corner-selective neuron is configured to respond to a specified angle and orientation pair in the image patch, including fully straight lines with 180° interior angle, by selection of inputs from orientation-selective neurons from the first topographically organized layer, wherein excitatory weights are configured for selected inputs that are selective for line segments that intersect at a vertex and have an orientation and angle that match the specified angle and orientation pair, with inputs of other orientations and locations configured to have less weight including inhibition.

10. The method of claim 8, wherein the corresponding property is an arc selectivity, and in which the contour segment selective layer is an arc selective layer wherein each arc-selective neuron of a subset of arc-selective neurons is selective to a set of line segments that lie on a path of the arc and have orientation tangent to a specified arc, and wherein the subset of arc-selective neurons is collectively selective of a plurality of arcs in the image patch; in which each arc-selective neuron is configured to respond to a specified interior angle and orientation pair in the image patch, including straight lines with no degree of curvature, by selection of inputs from orientation-selective neurons from the first topographically organized layer, wherein excitatory weights are configured for inputs that are selective for line segments that lie on the path of the arc and have orientation tangent to the specified arc, with inputs of other orientations and locations configured to have less weight including inhibition.

11. A non-transitory computer readable medium having instructions stored thereon that, upon execution by a computing device, cause the computing device to perform operations comprising:
configuring an artificial neural network to be selective to curvature, wherein the artificial neuron network comprises a first topographically organized layer of orientation-selective neurons, and wherein each orientation-selective neuron of a subset of the orientation-selective neurons is selective to an oriented line of inputs in an image patch, and wherein the subset of the orientation-selective neurons is collectively selective of a plurality of orientations in the image patch, the system comprising:
creating a second topographically organized layer of neurons selective for curve segments, wherein each curve-segment-selective neuron of a subset of the curve-segment-selective neurons is selective to a curve segment, and wherein the subset of curve-segment-selective neurons is collectively selective of a plurality of curve segments in the image patch; in which each curve-segment-selective neuron is configured to respond to a set of line segments in the image patch by selection of inputs from orientation-selective neurons from the first topographically organized layer, wherein excitatory weights are configured for selected inputs that are selective for line segments that form the curve segment and have positions and orientations that match the curve segment, with inputs of other orientations and locations configured to have less weight including inhibition; and
creating a curve-selective neuron, wherein the curve-selective neuron is selective to a curve having a specified center, a specified degree of curvature, and a specified orientation, the curve-selective neuron having as input an output of the topographically organized layer of curve-segment-selective neurons, in which the curve-selective neuron responds to the specified degree of curvature and at the specified orientation relative to the specified center by selection of inputs from curve-segment-selective neurons having an orientation that is determined systematically based on the position of the input in relation to the center, and wherein the selection is further based on a correspondence between the specified degree of curvature and a corresponding property for which individual input curve-segment-selective neurons are selective.

12. The non-transitory computer readable medium of claim 11, wherein the corresponding property is a corner selectivity, and in which the curve segment selective layer is a corner selective layer wherein each corner-selective neuron of a subset of the corner-selective neurons is selective to a pair of line segments that intersect at a vertex in the image patch, and wherein the subset of corner-selective neurons is collectively selective of a plurality of angle and orientation pairs in the image patch; in which each corner-selective neuron is configured to respond to a specified angle and orientation pair in the image patch by selection of inputs from orientation-selective neurons from the first topographically organized layer, wherein excitatory weights are configured for selected inputs that are selective for line segments that intersect at a vertex and have an orientation and angle that match the specified angle and orientation pair, with inputs of other orientations and locations configured to have less weight including inhibition.

13. The non-transitory computer readable medium of claim 11, wherein the corresponding property is an arc selectivity, and in which the curve segment selective layer is an arc selective layer wherein each arc-selective neuron of a subset of arc-selective neurons is selective to a set of line segments that lie on a path of the arc and have orientation tangent to a specified arc, and wherein the subset of arc-selective neurons is collectively selective of a plurality of arcs in the image patch; in which each arc-selective neuron is configured to respond to a specified interior angle and orientation pair in the image patch by selection of inputs from orientation-selective neurons from the first topographically organized layer, wherein excitatory weights are configured for inputs that are selective for line segments that lie on the path of the arc and have orientation tangent to the specified arc, with inputs of other orientations and locations configured to have less weight including inhibition.

14. The non-transitory computer readable medium of claim 13, wherein each arc is specified by defining an ellipse, including the size of the major and minor axes of the ellipse, and the arc is specified to follow a defined portion of the path of the ellipse.

15. The non-transitory computer readable medium of claim 11 in which there are pooling layers in between one or more of the layers selective for orientations, curve segments, and curvatures created by an aggregation function over the inputs from the preceding layer.

16. The non-transitory computer readable medium of claim 11 in which the orientation of the curve segment selective units in the curve selective layer is systematically oriented to be convex towards the center of the receptive field.

17. The non-transitory computer readable medium of claim 11 in which the orientation of the curve segment selective units in the curve selective layer is systematically oriented to be concave towards the center of the receptive field.

18. The non-transitory computer readable medium of configuring an artificial neural network to be selective to straight contours including approximately straight contours, wherein the artificial neural network comprises a first topographically organized layer of orientation-selective neurons, and wherein each orientation-selective neuron of a subset of the orientation-selective neurons is selective to an oriented line of inputs in an image patch, and wherein the subset of the orientation-selective neurons is collectively selective of a plurality of orientations in the image patch, the system comprising:

creating a second topographically organized layer of neurons selective for contour segments including both fully straight and curved segments, wherein each contour-segment-selective neuron of a subset of the contour-segment-selective neurons is selective to a contour segment, and wherein the subset of contour-segment-selective neurons is collectively selective of a plurality of contour segments in the image patch; in which each contour-segment-selective neuron is configured to respond to a set of line segments in the image patch by selection of inputs from orientation-selective neurons from the first topographically organized layer, wherein excitatory weights are configured for selected inputs that are selective for line segments that form the contour segment and have positions and orientations that match the contour segment, with inputs of other orientations and locations configured to have less weight including inhibition; and creating an approximately-straight-selective neuron, wherein the approximately-straight-selective neuron is selective to a straight or nearly straight contours having a specified orientation and degree of curvature, the approximately-straight-selective neuron having as input an output of the topographically organized layer of contour-segment-selective neurons, in which the approximately-straight-selective neuron responds at the specified orientation by selection of inputs from contour-segment-selective neurons having an orientation that matches the desired orientation, and wherein the selection is further based on a correspondence between the specified degree of curvature and a corresponding property for which individual input curve-segment-selective neurons are selective.

19. The non-transitory computer readable medium of claim 18, wherein the corresponding property is a corner selectivity, and in which the contour segment selective layer is a corner selective layer wherein each corner-selective neuron of a subset of the corner-selective neurons is selective to a pair of line segments that intersect at a vertex in the image patch, and wherein the subset of corner-selective neurons is collectively selective of a plurality of angle and orientation pairs in the image patch; in which each corner-selective neuron is configured to respond to a specified angle and orientation pair in the image patch, including fully straight lines with 180° interior angle, by selection of inputs from orientation-selective neurons from the first topographically organized layer, wherein excitatory weights are configured for selected inputs that are selective for line segments that intersect at a vertex and have an orientation and angle that match the specified angle and orientation pair, with inputs of other orientations and locations configured to have less weight including inhibition.

20. The non-transitory computer readable medium of claim 18, wherein the corresponding property is an arc selectivity, and in which the contour segment selective layer is an arc selective layer wherein each arc-selective neuron of a subset of arc-selective neurons is selective to a set of line segments that lie on a path of the arc and have orientation tangent to a specified arc, and wherein the subset of arc-selective neurons is collectively selective of a plurality of arcs in the image patch; in which each arc-selective neuron is configured to respond to a specified interior angle and orientation pair in the image patch, including straight lines with no degree of curvature, by selection of inputs from orientation-selective neurons from the first topographically organized layer, wherein excitatory weights are configured for inputs that are selective for line segments that lie on the path of the arc and have orientation tangent to the specified arc, with inputs of other orientations and locations configured to have less weight including inhibition.

\* \* \* \* \*